United States Patent Office 3,382,224
Patented May 7, 1968

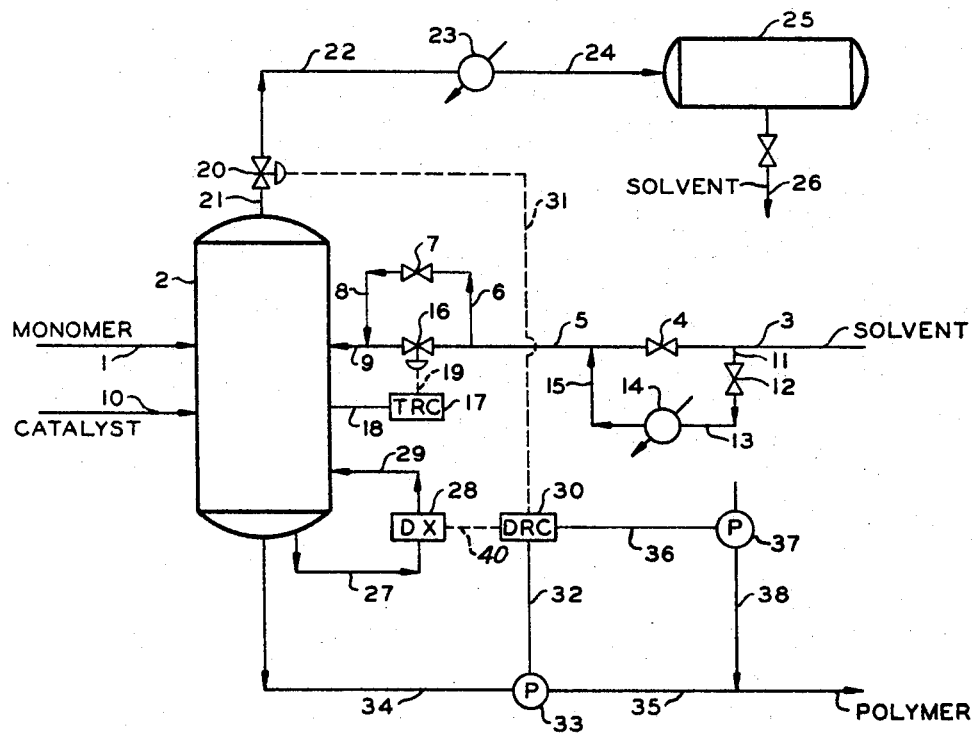

3,382,224
PROCESS FOR POLYMERIZING A SYSTEM CONTAINING A LOW SOLVENT/MONOMER RATIO
James Q. Wood, Bartlesville, Okla., assignor to Phillips Petroleum Company, a corporation of Delaware
Filed Jan. 4, 1965, Ser. No. 423,222
6 Claims. (Cl. 260—94.2)

ABSTRACT OF THE DISCLOSURE

Polymerization method comprising providing in a reaction zone a mixture of solvent and monomer which polymerizes exothermically, the mixture being formed at a low solvent to monomer ratio and at a temperature below the upper cloud point temperature of the mixture, adding catalyst to the mixture, allowing the reaction mass to be heated by the exothermic polymerization reaction to a temperature below the upper cloud point temperature, adding additional solvent to maintain the temperature of the reaction mass below the upper cloud point temperature.

---

This invention relates to a method and apparatus for polymerizing a monomer or mixture of monomers.

In solution polymerizing a monomer or mixture of monomers, hereafter referred to simply as monomer, it is highly desirable to use a low solvent-to-monomer ratio, i.e., 6/1 or less, in order to minimize the amount of solvent employed in the polymerization system thereby reducing initial plant investment cost and the amount of solvent lost due to evaporation, leakage, and the like during purification and recycle, and the consequent substantial reduction of cost of operation. Also, the use of low solvent-to-monomer ratios reduces the catalyst consumption, and, therefore, cost of the operation, since less solvent is present and it is less costly to remove catalyst poisons when the quantity of solvent that must be purified is relatively small.

Heretofore when low solvent-to-monomer ratios have been employed in an adiabatic reaction the reaction mass of monomer, solvent and catlayst was heated by the exothermic polymerization reaction to a temperature above the upper cloud point of the polymer solution present thereby precipitating a viscous, sticky polymer-rich phase in the desired solution of polymer. This polymer-rich phase tends to stick to and foul processing equipment and is, therefore, undesirable. The upper cloud point temperature is that point known in the art as the temperature above which the solvent employed can no longer dissolve the polymer formed and there is, therefore, formed a polymer-rich phase separate from the solvent phase. In some instances, the polymer simply precipitates out and forms a solid phase (solid polymer particles). A full and complete disclosure of the upper cloud point temperature is found in U.S. 2,837,504, issued to G. E. Hanson et al. on June 3, 1958.

Heretofore, in order to counteract this heating above the upper cloud point temperature the polymerization reaction was simply carried out at a temperature at least 50 or 60° F. lower than the preferred temperature of polymerization. This lower polymerization temperature was also accompanied with a significantly reduced polymerization rate which is undesirable from a time and productivity point of view.

It has now been found that a monomer which solution polymerizes exothermically can be polymerized using a low solvent-to-monomer ratio, i.e., from about 2/1 to about 4/1, in a batch process by forming an initial mixture of solvent and monomer in a reactor, i.e., at least 50° F. and preferably from about 150 to 200° F. below the upper cloud point temperature of this initial mixture, then adding to this mixture an amount of catalyst effective for polymerizing substantially all of the monomer present and allowing this reaction mass to be heated by the exothermic polymerization reaction to a temperature below, i.e., from about 1 to about 40, preferably from about 10 to about 30° F., the upper cloud point temperature of the solution of polymer present in the reactor at the end of the polymerization reaction. There is then added to the reaction mixture additional solvent at a temperature below that of the reaction mass, i.e., in the range of from about 0 to about 100° F. and in an amount sufficient to maintain the reaction mass at a temperature below, i.e., from about 10 to about 30° F., the upper cloud point temperature reaction mixture at the end of the polymerization reaction.

It was found that if the above procedure was followed the amount of additional cool solvent added to the original amount of solvent present in the initial mixture of solvent and monomer produces a reaction mass having an overall low solvent-to-monomer ratio, i.e., less than 6/1. Thus, a batch solution polymerization is effected by employing a low solvent-to-monomer ratio and without exceeding the upper cloud point temperature of the reaction mass at any time during the polymerization operation.

It was also found that following the above procedure the reaction mass could be flashed in the polymerization zone to a much higher polymer content than before possible and by known methods such as venting the reactor to the atmosphere to reduce the pressure in the zone and vaporize the solvent present. This can be done because due to the low solvent-to-monomer ratio the amount of polymer present in the reaction mass before flashing is higher, i.e., from about 15 to about 20 weight percent, than the amount of polymer present in the reaction mass when a high solvent-to-monomer ratio has been employed, i.e., about 8 weight percent, and because the upper cloud point temperature of a solution of polymer increases with the amount of polymer present in the solution. Thus, since the amount of polymer present in the solution produced by the procedure of this invention is greater, the upper cloud point temperature is higher and this allows for flashing of the reaction mass at a higher temperature which in turn increases the amount of solvent flashed from the reaction mass and increases the polymer concentration in the reaction mass ultimately removed from the reactor. Thus, where, before a reaction mass produced with high solvent-to-monomer ratios had an 8 weight percent polymer concentration which could be flashed at about 250° F. or less to about 15 weight percent polymer, this invention produces a reaction mass of at least about 15 weight percent polymer which can be flashed at about 160° F. or higher to form about 25 to about 30 weight percent polymer.

It was also found that the additional solvent added after the polymerization reaction had been initiated quenches or "shortstops" some of the active polymer molecules so that some lower molecular weight polymer is formed. Such quenching tends to form an end product which has broader molecular weight distribution than would ordinarily be formed if no quenching occurred. Since the polymers produced have a broader molecular weight distribution they have greater flexibility in fabricating processes and, therefore, are better "processing" polymers as compared to those ordinarily produced.

Accordingly, it is an object of this invention to provide a more economical and improved method of polymerizing a monomer or monomers. It is another object of this invention to provide a method of polymerizing a monomer or monomers by employing low solvent-to-monomer ratios without exceeding upper cloud point temperatures during the polymerization step.

Other aspects, objects and the several advantages of the invention will be apparent to those skilled in the art from the description and the appended claims.

The drawing illustrates diagrammatically a system embodying this invention.

In the drawing, monomer passes by 1 to reactor 2, solvent passes by 3 through valve 4, line 5, line 6, valve 7, line 8 and line 9 into reactor 2 to mix with the monomer. Mechanical mixing means such as turbine blenders, spiral agitators, and the like, not shown, can be employed in reactor 2 if desired. This mixture of solvent will be in a solvent-to-monomer ratio in a range of from about 2/1 to about 4/1, preferably 3/1. When the correct amount of solvent has been added to reactor 2, valves 4 and 7 are closed for reasons to be described. The mixture of monomer and solvent in reactor 2 is then heated to a temperature of from about 150 to about 200° F. below the upper cloud point of the initial solution of polymer to be formed in the reactor when the catalyst is subsequently added thereto. It should be noted that in lieu of heating the mixture in reactor 2, the monomer or solvent or both can be preheated in a manner such that the resulting mixture is at the desired temperature. The catalyst is then added by 10 to reactor 2. The amount of catalyst added will vary widely depending upon the materials employed and the degree of polymerization desired and generally will be known in the art. Generally, the amount of catalyst need only be that effective for polymerizing substantially all of the monomer present.

Upon addition of the catalyst the exothermic polymerization reaction starts and continuously evolves heat substantially all of which is maintained within reactor 2 thereby raising the temperature of the reaction mass in the reactor to a temperature which approaches, and if not checked will exceed, the upper cloud point temperature of the solution of polymer present in the reactor. After the closing of valve 4, solvent is then passed from 3 through 11, valve 12, 13, coolers 14 and line 15 into line 5. Since valve 7 is also closed, the cooled solvent in 5 passes to normally closed motor valve 16. Operation of motor valve 16 is controlled by temperature controller 17 which is operatively connected by 18 to the interior of reactor 2, and by 19 to motor valve 16.

Temperature recorded controller 17 will have a set point temperature of from about 10 to about 30°, preferably about 20° F., below the upper cloud point temperature of the solution of polymer present in reactor 2 at the end of the polymerization reaction. That is to say that it is precalculated to determine at what temperature in reactor 2 the cloud point for the solution of polymer present will be at the end of the polymerization reaction and a temperature of 10 to 30° F. below this precalculated temperature will be utilized as the set point temperature for temperature recorder controller 17. Thus, when the temperature in reactor 2 is from about 10 to about 30° F. below the set point for temperature recorder controller 17, as sensed by temperature recorder controller 17 through 18, temperature recorder controller 17 will open motor valve 16 thereby allowing cool solvent from 5 to pass through 9 into reactor 2 in an amount sufficient to maintain the reaction mass in reactor 2 at a temperature of from about 10 to about 30° F. below the upper cloud point above described. If the cooled solvent is in a temperature range of from about 0 to about 100° F., preferably from about 50 to about 90° F., the amount thereof required to be added to reactor 2 to maintain the temperature therein substantially constant at the temperature of from about 10 to about 30° F. below the upper cloud point, will result in a low overall solvent-to-monomer ratio, i.e. less than 6/1. The additional solvent will generally vary from about 100 parts to about 200 parts per part of monomer present in reactor 2. If desired, the additional solvent can be added in the form of a substantially continuous stream as described above or in separate and distinct increments. For example, 50 parts of solvent per part of monomer in reactor 2 can be added three or more times during the course of the polymerization reaction each of which addition will be separated from other additions by a period of time during which no additional solvent is added.

At the end of the polymerization reaction there is present in reactor 2 a solution of polymer in solvent, solvent, catalyst and unreacted monomer at a temperature in the range of from about 200 to about 400° F. and a pressure of from about 75 to about 150 p.s.i.g. This reaction mass will contain from about 15 to about 20 weight percent polymer. Solvent is removed from the reaction mass by opening motor valve 20 which in turn will lower the pressure in reactor 2 thereby vaporizing solvent present and the vaporous solvent will pass from reactor 2 by 21 through motor valve 20, 22, cooler 23, and 24 into accumulator 25. The now liquid solvent is removed from accumulator 25 by valved line 26 for reuse in reactor 2 or for other disposition as desired. During the period of flashing of the solvent from the reaction mass a part of that reaction mass is removed from reactor 2 through 27, density transmitter 28 and through 29 back to reactor 2. Density transmitter 28 senses the density of the reaction mass and when the density reaches a sufficiently elevated magnitude, thereby indicating a large portion of polymer is present, signals, by 40, to density recorder controller 30 which in turn, by 31, closes motor valve 20 and, by 32, initiates operation of pump 33. Pump 33 removes the reaction mass from reactor 2 through 34 into 35 for subsequent treatment such as steam stripping to recover the polymer present. A short time after initiation of operation of pump 33 density recorder controller 30, by 36, initiates operation of pump 37 which in turn forces a shortstop material into 35 to mix with the reaction mixture and stop the polymerization reaction. The reaction mass will contain from about 25 to about 30 weight percent of polymer at the time it is removed from reactor 2 by pump 33.

Generally, any monomer or mixture of monomers which solution polymerizes exothermically can be employed in practicing this invention. However, preferred monomers are dienes, still more preferably conjugated dienes, having from 4 to 6 carbon atoms per molecule, such dienes include butadiene, isoprene, piperylene, 2,3-dimethyl-1,3-butadiene, 2-methyl-1,3-pentadiene, and the like. Suitable monomers polymerizable with the above-mentioned dienes are the 1-olefins which include styrene, methylstyrene, and the like. Other applicable monomers and olefins are listed in copending application, Ser. No. 45,042, filed July 25, 1960, and now Patent No. 3,099,648.

The catalyst systems which can be employed in polymerizing the above monomer or monomers, or the above monomers with 1-olefins or mixtures of 1-olefins are the organoalkali metal systems known in the art. Such systems include methylsodium, isopropylpotassium, naphthylrubidium, phenylcesium, 4-butylphenylpotassium, cyclohexylsodium, 1,4-disodiumbenzene, 1,3,5-tripotassiumanthracene, 1,2,3,5-tetrarubidiocyclohexane, and the like.

Preferred catalysts are those containing lithium. These catalysts have the formula $RLi_x$, wherein R is hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing a polybutadiene, it is often preferred to use an alkyllithium compound, such as n-butyllithium, as the catalyst. Examples of other suitable organolithium compounds include methyllithium,
isopropyllithium,
tert-octyllithium,
n-decyllithium,
phenyllithium,
naphthyllithium, 4-butylphenyllithium,
p-tolyllithium,
4-phenylbutyllithium,
cyclohexyllithium,
4-butylcyclohexyllithium,
4-cyclobutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,5-dithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5-tetralithiodecane,
1,5,10,20-tetralithioeicosane,
1,2,3,5-tetralithiocyclohexane,
1,2,3,5-tetralithio-4-hexylanthracene, and the like.

A full and complete disclosure of polymerizing monomers with lithium-containing catalysts is found in copending application, Ser. No. 218,853, filed Aug. 23, 1962, now U.S. Patent 3,236,821. A full and complete disclosure of the polymerization of conjugated diene and conjugated dienes with 1-olefins in solution and in the presence of organolithium catalysts is found in copending application, Ser. No. 721,293, filed Mar. 13, 1958.

Generally, any catalyst inactivating or shortstop agent can be employed in this invention, suitable agents of which include such materials as hydroquinone, pyrrogallol, catechol, aniline, quinoline, fatty acids such as stearic acid and, preferably, rosin acid.

It should be noted that along with the shortstop, other additives can be incorporated in the polymer product of the invention. Such additives include antioxidants, extender oils, carbon black or other pigment, or any other desired ingredient. Suitable antioxidants include N-isopropyl-N'-phenyl-p-phenylenediamine, methylene - 2,2' - bis(n-methyl-6-tert-butylphenol), and other similar materials.

As mentioned before, this invention relates to solution polymerization and is therefore carried out in the presence of a hydrocarbon solvent. The solvent can be at least one material selected from the group consisting of aromatic hydrocarbons, paraffins and cycloparaffins and is preferably hydrocarbons of these types containing from 3 to 12 carbon atoms per molecule. Examples of such solvents include propane, n-butane, isobutane, n-pentane, isopentane, n-hexane, isooctane, cyclopentane, cyclohexane, methylcyclohexane, benzene, toluene, xylene, naphthalene and the like.

The conditions for the polymerization reactions of this invention are known in the art and will vary to a large degree depending upon the monomer, solvent and catalyst being employed. A full and complete disclosure of polymerizing conditions is found in the above-mentioned copending applications, Ser. No. 218,853, now U.S. Patent 3,236,821, and Ser. No. 721,293.

EXAMPLE

A batch of butadiene is bulk polymerized by charging 700 gallons (3640 pounds) of butadiene and 2100 gallons (11,550 pounds) of n-hexane both at 110° F. to a reactor having the capacity of 6,500 gallons. To this mixture is charged 2 pounds of n-butyllithium catalyst and the reaction is initiated at 110° F. Approximately 3,500 pounds of butadiene is polymerized to polybutadiene with a consequent exothermic polymerization heat of reaction of 600 B.t.u.'s per pound which requires 2,100,000 B.t.u.'s of heat to be dissipated to the butadiene and solvent in heating the mixture from 110 to 275° F. The solvent and butadiene in the reactor will absorb a total of 1,560,000 B.t.u.'s thereby leaving a total of 540,000 B.t.u.'s to be removed by the use of additional solvent. Additional n-hexane at a temperature of 80° F. is added in the amount of 840 gallons (4600 pounds) to maintain a temperature of 275° F. which is approximately below the upper cloud point for the polymer solution present at the end of the polymerization reaction. The pressure during the polymerization reaction is 100 p.i.s.g. and the temperature at the end of polymerization is 275° F. The reaction mixture at the end of the polymerization reaction contains 3500 pounds of rubber and 16,150 pounds of solvent or a total weight of 19,650 pounds. The amount of polymer present is 17.7 weight percent.

The reactor is vented to ambient temperature and pressure until 8000 pounds of n-hexane have been volatilized and removed thereby increasing the polymer content of the reaction mixture in the reactor to 30 weight percent. The reaction mixture is then a temperature of 170° F. and is removed therefrom and mixed with 70 pounds of fatty acid shortstop to stop the polymerization reaction. The contents are then steam stripped at 175° F. to remove butadiene and residual n-hexane from the polybutadiene product of the invention.

Reasonable variations and modifications of this invention can be made, or followed, in view of the foregoing, without departing from the spirit or scope thereof.

I claim:

1. A method of batch solution polymerizing which comprises providing in a reaction zone a mixture of a solvent and a monomer which polymerizes exothermically, said mixture being formed at a solvent-to-monomer ratio of from about 2/1 to about 4/1 and at a temperature at least 50° F. below the upper cloud point temperature of said mixture, adding to said mixture to form a reaction mass an effective catalytic amount of catalyst, allowing said reaction mass to be heated by the exothermic polymerization reaction to a temperature below the upper cloud point temperature of the solution of polymer present in said reaction zone at the end of the polymerization reaction, adding to said reaction mixture additional solvent at a temperature below that of the reaction mass and in an amount sufficient to maintain said reaction mass at a temperature below the upper cloud point temperature of the solution of polymer present at the end of the polymerization reaction until the polymerization reaction is substantially completed, removing from said reaction zone a solution of polymer and solvent and recovering therefrom said polymer.

2. The method of claim 1 wherein said solvent-to-monomer ratio is 3/1 and said reaction mass is allowed to be heated by the exothermic polymerization reaction to a temperature of about 20° F. below the upper cloud point temperature of the solution of polymer present in said reaction zone at the end of the polymerization reaction.

3. A method of batch solution polymerizing which comprises providing in a reaction zone a hydrocarbon solvent and a monomer which polymerizes exothermically to produce in said reaction zone a mixture having a solvent-to-monomer ratio in the range of from about 2/1 to about 4/1 at a temperature of from about 150 to about 200° F. below the upper cloud point temperature of said mixture, adding to said mixture to form a reaction mass an amount of catalyst effective for polymerizing substantially all of said monomer present, allowing said reaction mass to be heated by the exothermic polymerization reaction to a temperature from about 1 to about 40° F. below the upper cloud point temperature of the solution of polymer present in said reaction zone at the end of the polymerization reaction, adding to said reaction mixture additional solvent of a temperature in the range of from about 0 to about 100° F. in an amount sufficient to maintain said reaction mass at said temperature of from about 1 to about 40° F. below the upper cloud temperature until the polymerization reaction is substantially completed, removing from said reaction zone a solution of polymer and solvent and recovering therefrom said polymer.

4. The method according to claim 3 wherein said monomer is a mixture of at least two separate monomers capable of forming copolymers, and said catalyst is an organoalkali metal compound.

5. A method of batch solution polymerizing which comprises providing in a reaction zone a mixture of a hydrocarbon solvent and at least one monomer selected from the group consisting of dienes and 1-olefins, said mixture having a solvent-to-monomer ratio in the range of from about 2/1 to about 4/1 and a temperature of from about 150 to about 200° F. below the upper cloud point temperature of said mixture, adding to said mixture to form a reaction mass an amount of organolithium catalyst effective for polymerizing substantially all of said monomer present, allowing said reaction mass to be heated by the exothermic polymerization reaction to a temperature of from about 10 to about 30° F. below the upper cloud point temperature of the solution of polymer present in said reaction zone at the end of the polymerization reaction, adding to said reaction mixture additional solvent of a temperature in the range of from about 50 to about 90° F. in an amount sufficient to maintain said reaction mass at said temperature of from about 10 to about 30° F. below the upper cloud point temperature until the polymerization reaction is substantially completed, removing from said reaction zone a solution of polymer and solvent and recovering therefrom said polymer.

6. A method of batch solution polymerizing which comprises forming in a reaction zone a mixture of butadiene and n-hexane having a solvent-to-monomer ratio of about 3/1 and a temperature of about 110° F., adding to said mixture to form a reaction mass an amount of organolithium catalyst effective for polymerizing substantially all of said monomer present, allowing said reaction mass to be heated by the exothermic polymerization reaction to a temperature of about 275° F., adding to said reaction mixture additional n-hexane at a temperature of about 80° F. in an amount sufficient to maintain said reaction mass at about 275° F. until the polymerization reaction is completed, removing from said reaction zone a solution of polymer and solvent and recovering therefrom said polymer.

References Cited

UNITED STATES PATENTS

| 2,458,456 | 1/1949 | Wolk | 260—94.2 |
| 2,460,973 | 2/1949 | Calfee et al. | 260—94.2 |
| 2,475,016 | 7/1949 | De Nie | 260—94.2 |

JOSEPH L. SCHOFER, *Primary Examiner.*

H. WONG, *Assistant Examiner.*